A. S. HRUSKA.
COASTER BRAKE FOR BICYCLES.
APPLICATION FILED SEPT. 4, 1917.
Patented Oct. 15, 1918.
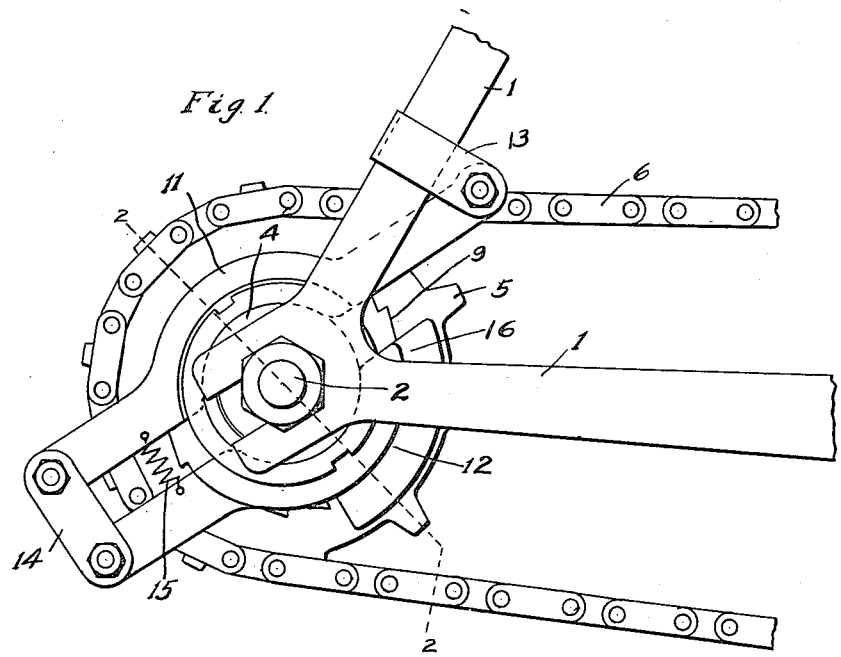
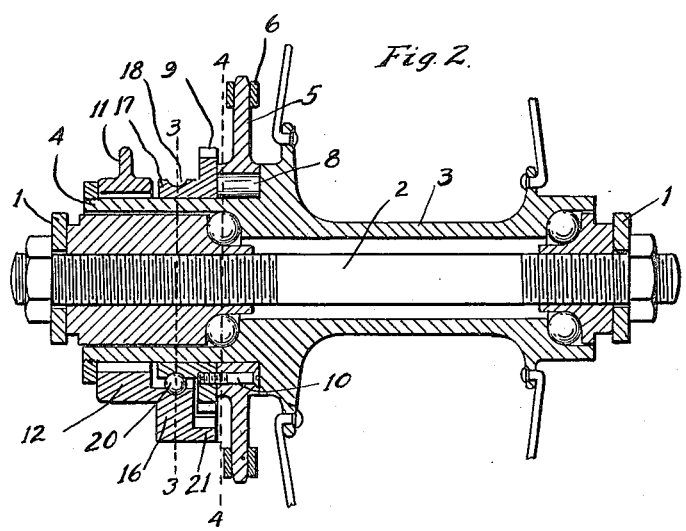
Inventor
Anthony S. Hruska A. S. HRUSKA.
COASTER BRAKE FOR BICYCLES.
APPLICATION FILED SEPT. 4, 1917.
1,281,378.
Patented Oct. 15, 1918.
2 SHEETS—SHEET 2.
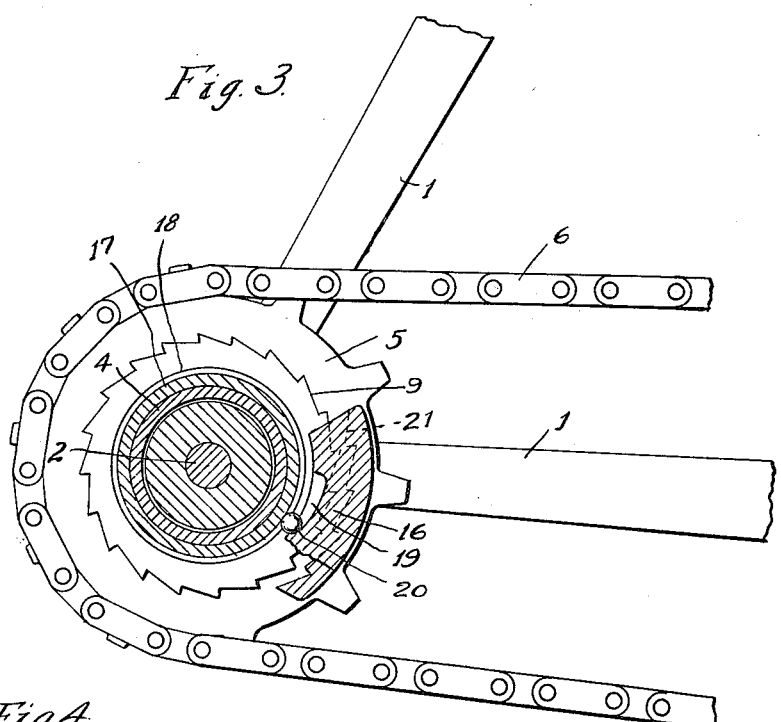
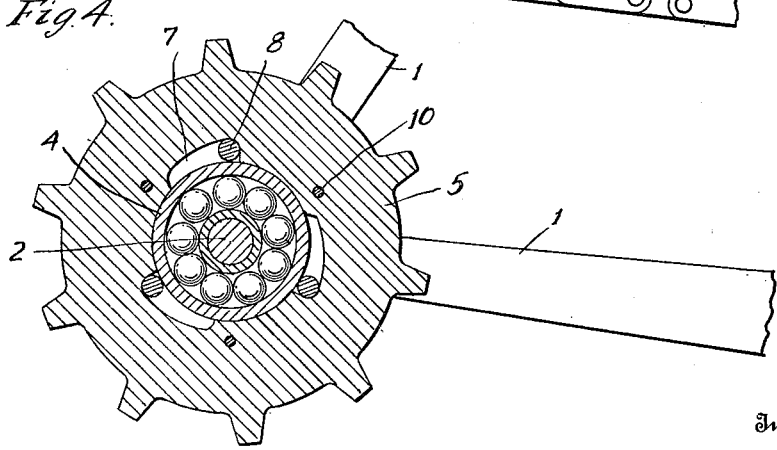
Inventor
Anthony S. Hruska.
Witness
L. S. Woodhull
By B. S. Wheeler
Attorney

UNITED STATES PATENT OFFICE.

ANTHONY S. HRUSKA, OF DETROIT, MICHIGAN.

COASTER-BRAKE FOR BICYCLES.

1,281,378.     Specification of Letters Patent.     Patented Oct. 15, 1918.

Application filed September 4, 1917. Serial No. 189,455.

*To all whom it may concern:*

Be it known that I, ANTHONY S. HRUSKA, a citizen of the United States, residing at Detroit, in the county of Wayne and State of Michigan, have invented a new and useful Coaster-Brake for Bicycles, of which the following is a specification.

This invention relates to coaster brakes for bicycles or motor cycles such as automatically cut off the drive to a chain driven axle when the driving strain on the chain is relaxed, so that the hub may turn independently of the driving means and which will apply a brake to the axle when the chain is subjected to a strain reverse to that normally acting to drive the same.

The object of the invention is to provide a coaster brake of the character described that will be compact, simple, efficient, and comparatively inexpensive to produce, and not likely to get out of working order.

A preferred embodiment of the construction attaining this object is hereinafter described and is illustrated in the accompanying drawings, wherein, Figure 1 is a view in side elevation of the driving hub of a bicycle or motorcycle, showing portions of the frame supporting said axle and of the driving mechanism.

Fig. 2 is a section on line 2—2 of Fig. 1, showing the interior of the hub.

Fig. 3 is a section on line 3—3 of Fig. 2, showing particularly the mechanism whereby the brake is applied through a reverse strain exerted upon the driving chain.

Fig. 4 is a section on line 4—4 of Fig. 2, showing the mounting of the driving sprocket upon the hub.

In these views the reference character 1 designates the rear forks of a bicycle or motorcycle frame, and 2 an axle mounted in said forks. Upon said axle is journaled the hub 3 of a driven wheel and said hub is formed at one end with an extension 4 upon which the driving and braking means are mounted. The driving means consists of a sprocket 5 upon which a chain 6 travels, said sprocket being mounted loosely upon the inner portion of the extension 4, and having a plurality of arcuate recesses 7 of varying depths formed in its inner perimeter to respectively receive rollers 8 which contact with the periphery of the hub extension 4. The arrangement is such that the rollers are caused to wedge into the more shallow portion of their recesses when the sprocket is driven by the chain in a manner to effect a gripping engagement between the sprocket and hub 3, causing the parts to rotate as a unit. If, however, the driving strain on the chain 6 is relaxed, through the retarding of the pedals (not shown) by the cyclist the rollers 8 will be carried by rotation of the hub 3 into the deeper extremities of the recesses 7 where they have no tendency to effect unitary rotation of the hub and sprocket, and the wheel of the vehicle will be free to coast. Adjacent the sprocket 5 a ratchet wheel 9 is loosely mounted upon the extension 4 and is rigidly secured to the sprocket by a plurality of screws 10. The outer portion of the extension 4 is adapted to be oppositely embraced by the arcuate portions of a pair of levers 11 and 12, arranged between the outer face of the sprocket and the forks 1 of the frame. The upper lever 11 extends symmetrically forwardly and rearwardly of the hub, its forward end being pivoted upon a bracket 13 carried to one of the forks 1. The lower lever 12 projects rearwardly similarly to the upper one and is supported from the latter by a link 14 pivotally connecting the rear ends of the two levers and also by a coiled spring 15 extended between said levers adjacent their pivoted ends and tending to bring their arcuate portions into bearing engagement with the extension 4 of the hub. The arcuate portion of the lever 12 has a lateral projection 16 extending through a lesser arc of an increased radius and occupying a slightly spaced relation to a ring 17 loosely embracing the member 4 and integrally formed with the ratchet wheel 9. The ring 17 is formed with an annular peripheral groove 18 and opposite said groove an arcuate recess 19 of varying depth is formed in the projection 16. Said recess contains a ball 20 which, when the sprocket 5 is driven, is shifted through contact with the grooved portion of the ring 17 into the lower or shallower portion of the recess 19, where it acts as a spacer to hold the projection 4 a maximum distance from said ring. If, however, a slight reverse rotation is imparted to the sprocket 5, through the chain 6, the ball 20 is raised through its engagement in the groove 18 and enters the deeper portion of the recess 19. Said ball then ceases to function as a spacer and the action of the spring 15 upon the lever 12 brings the projection 16 into closer proximity to the ring 17. The projection 16 has formed integral therewith a rack of ratchet teeth 21 which, when the ball 20 exercises its spacer function, are just out of engagement with the teeth of the ratchet wheel 9 (see Fig. 3). When, however, said ball enters the deeper portion of its recess, as just described, engagement between the teeth of the rack 21 and those of the ratchet wheel 9 takes place. If the cyclist continues to subject the sprocket 5 and the attached ratchet wheel 9 to a force tending to produce reverse rotation (as by back pedaling) the lower lever, which carries the rack 21, is pressed upward and the upper lever is drawn down, so that the arcuate braking faces of said levers bear upon the hub extension 4 with a force proportionate to that transmitted through the chain and braking pressure is applied to retard the vehicle wheel. As soon as the chain is relaxed so as to release the sprocket and ratchet wheel from the reversing force, the ball 20 will of its own weight drop into the lower portion of its recess and disengage the ratchet wheel.

It is to be observed that the above described construction avoids the use of pawls playing on ratchet teeth which under certain conditions tends to produce an objectionable rattle in coaster brakes using such elements.

What I claim is:

1. In a coaster brake, the combination with a hub, of a driving member associated therewith, means establishing driving engagement of said member with the hub, permitting the hub to turn independently of the driving member in its normal direction of rotation, a brake lever having a portion adapted to frictionally engage the hub in a certain position of the lever, a brake actuating member carried by the driving member adapted for engagement with said lever, in a certain position of the latter, upon reverse rotation of the driving member, and a member normally functioning as a spacer to maintain the brake lever out of engagement with said actuating member and displaceable by said actuating member to permit such engagement upon reverse rotation of the driving member.

2. In a coaster brake, a hub, a driving member mounted upon said hub, means establishing driving engagement of said member with the hub, permitting rotation of the latter in its normal direction independently of said member, a brake lever having an arcuate portion engageable with the hub, a ratchet segment carried by said lever, and a ratchet wheel attached to said driving member for engaging said ratchet segment upon reverse rotation of said member to induce braking engagement of said lever with the hub.

3. In a coaster brake, a hub, a driving member mounted upon said hub, means establishing driving engagement of said member with the hub, permitting rotation of the latter in its normal direction independently of said member, a brake lever having an arcuate portion engageable with the hub, a ratchet segment carried by said lever, a ratchet wheel attached to said driving member for engaging said ratchet segment upon reverse rotation of said member to induce braking engagement of said lever with the hub, and means maintaining the ratchet segment out of engagement with said ratchet wheel when the driving member is either driving or idling.

4. In a coaster brake, a hub, a driving member mounted upon said hub, means establishing driving engagement of said member with the hub, permitting rotation of the latter in its normal direction independently of said member, a brake lever having an arcuate portion engageable with the hub, a ratchet segment carried by said lever, a ratchet wheel attached to said driving member for engaging said ratchet segment upon reverse rotation of said member to induce braking engagement of said lever with the hub, and a member normally functioning as a spacer to maintain the ratchet segment out of engagement with the ratchet wheel, and displaceable by the driving member to permit such engagement when the driving member is reversely rotated.

5. In a coaster brake, a hub, a driving member associated with the hub, means for establishing driving engagement of said member with the hub permitting the latter to turn independently of said driving member in its normal direction of rotation, a pair of pivotally connected brake levers oppositely engageable with the hub, one of said levers being pivoted at a fixed point, and means actuable by the driving member upon reverse rotation thereof for exerting brake pressure upon the hub through both of said levers.

6. In a coaster brake, a hub, a driving member associated with the hub, means for establishing driving engagement of said member with the hub permitting the latter to turn independently of said driving member in its normal direction of rotation, a pair of pivotally connected brake levers oppositely engageable with the hub, one of said levers being pivoted at a fixed point, and a brake actuating member carried by the driving member engageable with the other of said levers upon reverse rotation of the driving member for exerting brake pressure upon the hub through both of said levers.

7. In a coaster brake, a hub, a driving member associated with the hub, means for establishing driving engagement of said member with the hub permitting the latter to turn independently of said driving member in its normal direction of rotation, a pair of pivotally connected brake levers oppositely engageable with the hub, one of said levers being pivoted at a fixed point, a ratchet segment carried by the other of said levers, and a ratchet wheel associated with the driving member for engagement with said segment upon reverse rotation of the driving member to exert brake pressure upon the hub through both of said levers.

8. In a coaster brake, a hub, a driving member associated with the hub, means for establishing driving engagement of said member with the hub permitting the latter to turn independently of said driving member in its normal direction of rotation, a pair of pivotally connected brake levers oppositely engageable with the hub, one of said levers being pivoted at a fixed point, a spacer positioned between the other lever and the hub normally limiting displacement of said lever toward the hub, a brake actuating member carried by the driving member engageable with said spacer upon reverse rotation of the driving member to allow the spaced lever to shift toward the hub, and engageable with said brake lever when so shifted to exert brake pressure upon the hub through both levers by maintaining the reverse driving force upon the driving member.

In testimony whereof I sign this specification.

ANTHONY S. HRUSKA.

Copies of this patent may be obtained for five cents each, by addressing the "Commissioner of Patents, Washington, D. C."